(12) United States Patent
Youn et al.

(10) Patent No.: US 9,374,220 B2
(45) Date of Patent: Jun. 21, 2016

(54) SYSTEM AND METHOD FOR PROVIDING COMPRESSED ENCRYPTION AND DECRYPTION IN HOMOMORPHIC ENCRYPTION BASED ON INTEGERS

(71) Applicant: Electronics and Telecommunications Research Institute, Daejeon (KR)

(72) Inventors: Taek Young Youn, Gyeonggi-do (KR); Nam Su Jho, Daejeon (KR); Jung Yeon Hwang, Daejeon (KR); Ku Young Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 146 days.

(21) Appl. No.: 14/174,519

(22) Filed: Feb. 6, 2014

(65) Prior Publication Data
US 2014/0270159 A1    Sep. 18, 2014

(30) Foreign Application Priority Data

Mar. 18, 2013    (KR) .................. 10-2013-0028582

(51) Int. Cl.
H04L 9/30    (2006.01)
H04L 9/08    (2006.01)
H04L 9/00    (2006.01)
(52) U.S. Cl.
CPC ............. *H04L 9/0861* (2013.01); *H04L 9/008* (2013.01); *H04L 9/30* (2013.01)
(58) Field of Classification Search
None
See application file for complete search history.

(56) References Cited

U.S. PATENT DOCUMENTS

| | | | |
|---|---|---|---|
| 8,675,874 B2* | 3/2014 | Muratani et al. | 380/269 |
| 8,934,631 B2* | 1/2015 | Hanatani et al. | 380/269 |
| 2007/0112968 A1* | 5/2007 | Schwab | 709/229 |
| 2009/0207999 A1* | 8/2009 | Yonemura et al. | 380/30 |
| 2010/0046741 A1* | 2/2010 | Isogai et al. | 380/28 |
| 2010/0046745 A1* | 2/2010 | Hanatani et al. | 380/30 |
| 2010/0046746 A1* | 2/2010 | Yonemura et al. | 380/30 |
| 2011/0110525 A1 | 5/2011 | Gentry | |
| 2012/0039473 A1 | 2/2012 | Gentry et al. | |
| 2013/0329883 A1* | 12/2013 | Tamayo-Rios | H04L 9/008 380/28 |
| 2015/0180659 A1* | 6/2015 | Youn | H04L 9/0861 380/44 |

OTHER PUBLICATIONS

M. van Dijk and D. Woodruff. Asymptotically Optimal Communication for Torus-Based Cryptography. Advances in Cryptology—CRYPTO 2004 Lecture Notes in Computer Science vol. 3152, 2004, pp. 157-178.*
Coron, Jean-Sebastien et al., "Fully Homomorphic Encryption over the Integers with Shorter Public Keys," Crypto, vol. 6841:487-504 (2011).
Coron, Jean-Sebastien et al., "Public Key Compression and Modulus Switching for Fully Homomorphic Encryption over the Integers," Eurocrypt, vol. 7237:446-464 (2012).
Van Dijk, Marten et al., "Fully Homomorphic Encryption over the Integers," Eurocrypt, vol. 6110:24-43 (2010).

* cited by examiner

*Primary Examiner* — Michael R Vaughan
(74) *Attorney, Agent, or Firm* — Nelson Mullins Riley & Scarborough LLP

(57) ABSTRACT

The present invention relates to a technique which provides a function of compressed encryption large pieces of plaintext information in a single ciphertext in order to improve a space efficiency of the encryption data which occupies most of a storage space to design an efficient SHE technique which is a base of the FHE technique design. More specifically, the present invention relates to a technique which is designed to improve a structure in which only one bit is encrypted/decrypted in the technique of the prior art to encrypt/decrypt multiple bit information to improve the space efficiency for storing a ciphertext.

12 Claims, 7 Drawing Sheets

10

SYSTEM AND METHOD FOR PROVIDING COMPRESSED ENCRYPTION AND DECRYPTION IN HOMOMORPHIC ENCRYPTION BASED ON INTEGERS

CROSS-REFERENCE TO RELATED APPLICATIONS

This application claims priority to and the benefit of Korean Patent Application No. 10-2013-0028582 filed in the Korean Intellectual Property Office on Mar. 18, 2013, the entire contents of which are incorporated herein by reference.

TECHNICAL FIELD

Embodiments relate to homomorphic encryption which is a technology which provides an operating function for original data using only encryption data and open information such as a public key without having secret information for data which is encrypted so as to restore plaintext information only using the secret information of a specific user.

BACKGROUND ART

A homomorphic encryption is an original cryptography which provides an operation for encryption data. Specifically, if the encryption data is given, without using encrypted plaintext data or secret key required for decryption, a specific operation is performed on the encryption data to apply an intended operation to the encrypted plaintext data so that various types of data processing as a proxy including numerical calculation for the encryption data are allowed without losing a confidentiality of the encrypted information.

Studies on homomorphic encryption of the related are very restricted. A homomorphic encryption which provides only a characteristic of an additive group which performs only addition and subtraction or a homomorphic encryption which provides only a characteristic of a multiplicative group which performs only multiplication and division is suggested so that homomorphic encryption which stores a characteristic of a single operation is widely known. However, it is generally recognized that a design for a technique which stores two different operation groups is difficult. A technique which provides both operations is suggested based on a pairing operation defined in an elliptic curve, but the technique has a restriction that the multiplication is limited to only one time. The homomorphic encryption may be used for a statistical purpose to calculate an average of encrypted private information but the design of the homomorphic encryption which may support all arbitrary operations is still difficult problems and thus many studies have been performed in order to solve the difficult problems.

Recently, the homomorphic encryption which supports all arbitrary operations is designed by Gentry on 2009 for the first time. The technique designed by Gentry designs a somewhat homomorphic encryption (hereinafter, abbreviated as SHE) which may perform limited number of operations which is determined at a predetermined level regardless of the type of the operation and expands to a Fully homomorphic encryption (hereinafter, abbreviated as FHE) which stores the arbitrary operation based on the SHE without limitation. The FHE which is designed by the expansion technique of Gentry has most of properties such as a length of the key or an operation performance of the SHE technique which is the base of the FHE as it is. Therefore, it is recognized that the important problem is to design an efficient SHE and the SHE techniques are designed based on a hardness of the difficult problems defined in the lattice or the integer till now. The techniques which have been suggested till now provide only one bit encryption so that n ciphertexts are generated through 1 bit encryptions.

Recently, the studies on the homomorphic encryption design focus to realize a length of the public key of the suggested techniques. Such studies are very appropriate and necessary because the known techniques use very large public keys. The homomorphic encryption mainly has a cloud service or a big data service where large quantity data is stored in a server in an actual application environment as a main application target so that a technology which reduces not only a length of the public key which uses a fixed spatial resource but also a size of the encryption data is important and necessary in order to be used in an actual application environment. Actually, the public key has a fixed length. However, as a size of data which is stored by the user is increased, a service provider needs to pay for a storage space in proportional to the increasing size of data. As a result, in order to use the homomorphic encryption as a primitive for acting as a proxy in stable and efficient processing of the encryption data, it is very important to reduce the size of the encryption data generated when the same data is encrypted.

SUMMARY OF THE INVENTION

The present invention has been made in an effort to provide a technique which provides a function of compressed encryption large pieces of plaintext information in a single ciphertext in order to improve a space efficiency of the encryption data which occupies most of a storage space to design an efficient SHE technique which is a base of the FHE technique design. More specifically, the present invention has been made in an effort to provide a technique which is designed to improve a structure in which only one bit is encrypted/decrypted in the technique of the related art to encrypt/decrypt multiple bit information to improve the space efficiency for storing a ciphertext. Specifically, a technique which, when an compressed encryption which generates l bit plaintext information as one ciphertext is provided, stores only one ciphertext instead of l ciphertexts is provided.

An exemplary embodiment provides a compressed encryption/decryption providing system including a key generation module which receives a predetermined security parameter and a value of a compression ratio and generates a public key and a secret key for encrypting and decrypting plaintext information; an encryption module which encrypts the plaintext information using the generated public key, wherein the encryption module encrypts l bits selected from the plaintext information at once; and a decryption module which decrypts the compressed ciphertext using the generated secret key.

The above-mentioned compressed encryption means a technique which is designed to improve a structure in which only one bit is encrypted/decrypted in the technique of the related art to encrypt/decrypt multiple bit information to improve the space efficiency for storing a ciphertext.

The key generation module may use the secret key which is generated as an odd number to select the public key in accordance with a predetermined condition.

At least one key may be selected from a key group which satisfies a determined condition using the secret key as a public key.

The key generation module may use the secret key generated as an odd number to generate a public key to compressed encrypt the plaintext in accordance with a predetermined condition. The above-mentioned compressed encrypt means method for encrypting multiple bit at once.

The encryption module may encrypt l bits selected from the plaintext information using a selected arbitrary subset and a selected arbitrary random number.

Another exemplary embodiment provides an encryption/decryption providing method including receiving a predetermined security parameter and a value of a compression ratio and generating a public key and a secret key for encrypting and decrypting plaintext information; encrypting the plaintext information using the generated public key, wherein encrypting bits selected from the plaintext information at once; and decrypting the compressed ciphertext using the generated secret key.

Another exemplary embodiment provides an encryption/decryption providing method including receiving a predetermined security parameter and a value of a compression ratio and generating a public key which encrypts the plaintext in accordance with a predetermined condition using the secret key which is generated as an odd number; and encrypting bits selected from the plaintext information using a selected arbitrary subset and a selected arbitrary random number.

According to the present invention, the plaintext corresponding to a compression ratio l which is defined in advance in one ciphertext is encrypted so that the number of ciphertexts required to store 1 bit plaintext information in an encrypted status is reduced 1 from to l. As a result, a cost for a space for storing the encryption data is reduced at the same ratio. An application environment in which data is encrypted to be stored in a server of a service provider and an operation therefor is consigned is generally recognized that the amount of data to be stored is very large. Accordingly, when the data is encrypted and stored according to the application of the present invention, the number of ciphertexts to be stored at a ratio of 1/l is reduced so that a cost for the space is saved. An amount of reduced cost is increased in proportional to the size of the data so that the large reduction in cost is expected when a characteristic of the application environment is considered.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
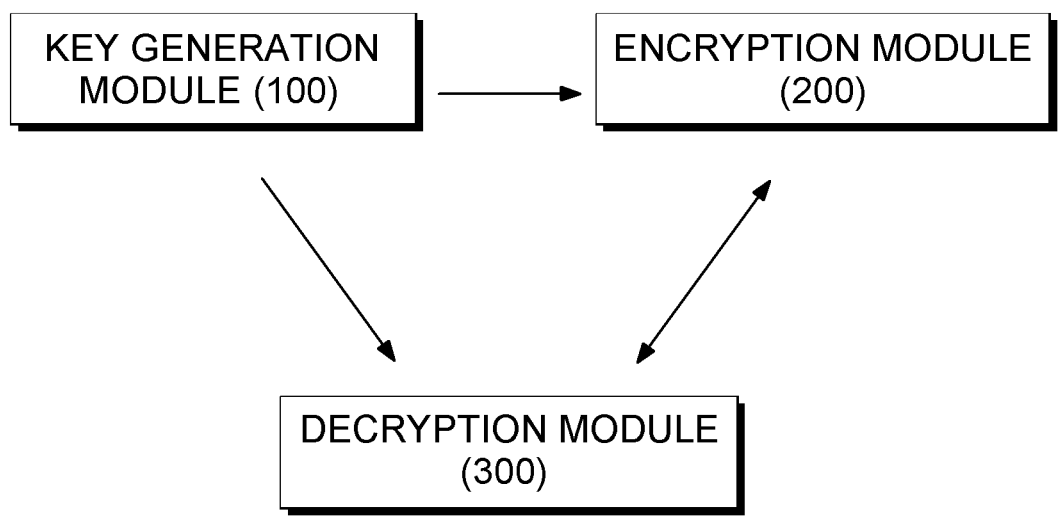
FIG. 1 is a block diagram illustrating a compressed encryption/decryption system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description illustrates only a principle of the present disclosure. Therefore, it is understood that those skilled in the art various may implement the principle of the present invention and invent various apparatuses which are included in a concept and a scope of the present disclosure even though not clearly described or illustrated in the specification. It should be further understood that all conditional terms and exemplary embodiments which are described in the specification are intended to understand the concept of the invention but the present invention is not limited to the exemplary embodiments and states described in the specification.

The above objects, features, and advantages will be more obvious from the detailed description with reference to the accompanying drawings, and the technical spirit of the present invention may be easily carried out by those skilled in the art. However, in describing the present invention, if it is considered that description of related known configuration or function may cloud the gist of the present invention, the description thereof will be omitted. Hereinafter, an exemplary embodiment of the present disclosure will be described in detail with reference to the accompanying drawings.

FIG. 1 is a block diagram illustrating a compressed encryption/decryption system according to an exemplary embodiment of the present invention. A compressed encryption/decryption system according to an exemplary embodiment uses homomorphic encryption. The homomorphic encryption is an original technology which is utilized in various application environments where data processing as a proxy including an operation on encrypted private information in which main information of a client is encrypted and stored in a server of a service provider like a cloud service and the service provider generates a result of an operation on the stored encryption data in accordance with the request of the client is performed.

A specific technical field of the present invention is a technology which is appropriate to improve the performance of the original technology such that the size of the plaintext which may be stored in a single ciphertext is increased while providing an inherit function so as to significantly reduce the size of the database in which information of the client thus to reduce the cost for providing a service.

Referring to FIG. 1, an encryption/decryption system 10 according to an exemplary embodiment includes a key generation module 100, an encryption module 200, and a decryption module 300.

The above-mentioned compressed encryption means a technique which is designed to improve a structure in which only one bit is encrypted/decrypted in the technique of the related art to encrypt/decrypt multiple bit information to improve the space efficiency for storing a ciphertext.

The key generation module 100 receives a predetermined security parameter and a value of a compression ratio and generates a public key and a secret key for encrypting and decrypting plaintext information. The general information is referred to as plaintext (information) and a method that hides contents of the plaintext is referred to as encryption. The encrypted plaintext is referred to as a ciphertext and a method that converts the ciphertext into the plaintext is referred to as decryption.

The public key algorithm is an algorithm which uses different keys in encryption and decryption. Even though a third party knows an encryption key, the third party cannot decrypt the ciphertext. Only a person who owns a decryption key decrypts the ciphertext. Therefore, due to such a characteristic, the encryption key is open and the decryption key is hidden. The encryption key is referred to as a public key and the decryption key is referred to as a private key.

Hereinafter, a method that generates the public key and a secret key in the key generation module 100 will be described with reference to FIG. 2.

Figure 2:
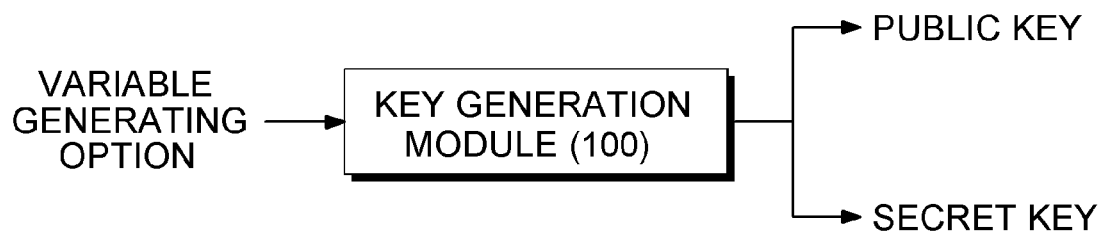
FIG. 2 is a diagram illustrating a generating procedure of a secret key and a public key of a homomorphic encryption according to an exemplary embodiment of the present invention.

FIG. 2 is a diagram illustrating a generating procedure of the secret key and the public key of a homomorphic encryption which is suggested according to an exemplary embodiment of the present invention.

Referring to FIG. 2, a parameter which performs the encryption and the decryption is generated in the key generation module 100 in the present invention. The key generation module 100 receives k which is a stability reference and l which is a compression ratio as inputs to generate a public key and a secret key which comply a corresponding condition. Information on all generated keys is set to provide a stability corresponding to input k bits.

In other words, if not specifically mentioned, it is understood that all variables are selected within a range where k bits of stability is not harmed for a known analysis method.

The key generation module 100 performs a process of selecting the public key in accordance with a predetermined condition using the secret key which is generated as an odd number. That is, when the key generation module 100 is executed, an odd number p which satisfies a condition of $p-1=2^l*s$ with respect to an arbitrary integer is generated.

In this configuration, even though an odd number p having a type of $p+1=2l*s$ may achieve the same object, in this description, the configuration of the $p-1=2l*s$ will be used.

Further, the key generation module 100 performs a process of selecting the public key until the public key selected using the secret key becomes an odd number, a remainder obtained by dividing with the secret key becomes an even number and at least one key is selected from a group of keys which satisfy a condition determined using the secret key as a public key.

That is, a group which satisfies the following Equation 1 is considered for p.

$$D_{\gamma,\rho}(p)=\{x=p*q+r:q\in Z\cap[0,2^\gamma/p), r\in Z\cap(-2^\rho,2^\rho)\} \quad \text{Equation 1}$$

The key generation module 100 selects $x_i \leftarrow D_{\gamma,\rho}(p)$ for i=0 to τ in order to generate the public key. The largest value is set as $x_0$ and the public key selecting process is performed until the $x_0$ becomes an odd number and a remainder when $x_0$ is divided by p becomes an even number.

In order to additionally generate $x'_0$ for compressed encryption, $q\in z\cap(0,2^\gamma/p)$ and $r\in z\cap(-2^\rho,2^\rho)$ are arbitrarily selected and $x'_0$ is calculated by $x'_0=pq+2^l r$. If a variable which satisfies the condition is selected, the public key becomes $pk=\{x_0, x'_0, x_1, \ldots, x_\tau\}$ and the secret key corresponding thereto is an odd number p which is first selected. The key generation module 100 outputs the generated public key and secret key.

The encryption module 200 encrypts the plaintext information using the generated public key, particularly encrypts l bits (or multiple bit) selected from the plaintext information at once. The l of l bits means natural number.

Figure 3:
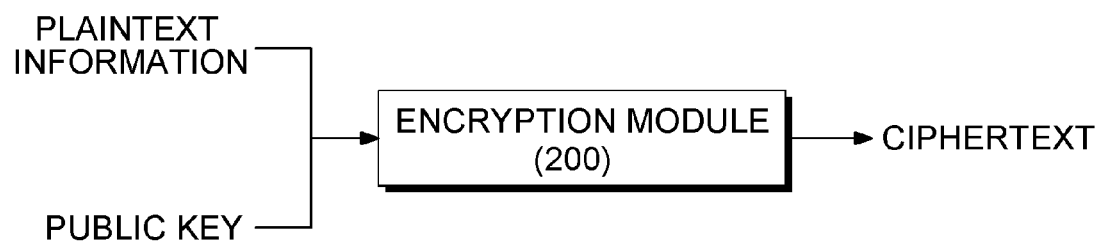
FIG. 3 is a diagram illustrating an encryption process for a given plaintext according to an exemplary embodiment of the present invention.

FIG. 3 is a diagram illustrating an encryption process for a given plain text according to an exemplary embodiment of the present invention.

Referring to FIG. 3, the compressed encryption for a given l bit plaintext is performed as follows. Input information which is basically requested for encryption is l bit plaintext data $M\in\{0,1\}^l$ and a public key $pk=\{x_0, x'_0, x_1, \ldots, x_\tau\}$ required for encryption. If two input information required for encryption is input, the encryption module 200 selects an arbitrary subset $S\subset\{1,\ldots,\tau\}$ and an arbitrary random number $r\in Z\cap(-2^\rho,2^\rho)$.

In this exemplary embodiment, the encryption module 200 encrypts l bits selected from the plaintext information using the selected arbitrary subset and the selected arbitrary random number. That is, the selected information S and r is used to encrypt input plaintext data by the following Equation 2.

$$c = M + 2^l r + 2^l \sum_{i\in s} x_i \bmod(x'_0) \quad \text{Equation 2}$$

Hereinafter, the ciphertext for l bit plaintext data like c is called as a compressed ciphertext. The suggested technique is described with reference to compressed encryption having the l bit plaintext as an input but encryption for single bit is also allowed similarly to the known technique.

When m which is a single bit of plaintext is encrypted, similarly to the compressed encryption, an arbitrary subset $S\subset\{1,\ldots,\tau\}$ and an arbitrary random number $r\in Z\cap(-2^\rho,2^\rho)$ are selected and the ciphertext is generated by the following Equation 3.

$$c = M + 2r + 2\sum_{i\in S} x_i \bmod(x_0) \quad \text{Equation 3}$$

The decryption module 300 decrypts the compressed ciphertext using a generated secret key.

Figure 4:
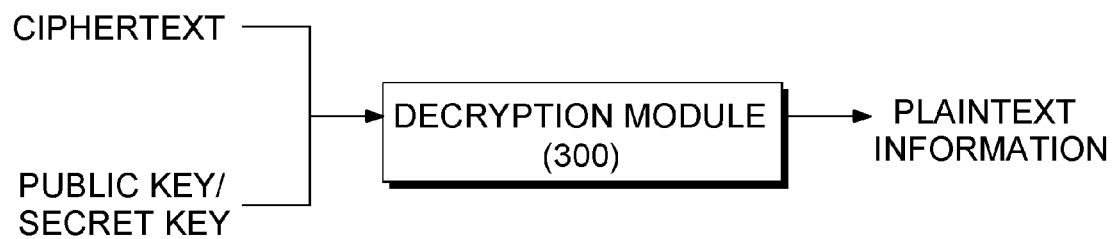
FIG. 4 is a diagram illustrating a decryption process for a given encrypted ciphertext according to an exemplary embodiment of the present invention.

FIG. 4 is a diagram illustrating a decryption process for a given encrypted cryptograph according to an exemplary embodiment of the present invention.

Referring to FIG. 4, the compressed ciphertext c for l bit plaintext data is decrypted by the following processes. The decryption module 300 uses the given compressed ciphertext c and information on the public key and the secret key for decryption are used as inputs.

If all required input information is provided, the decryption module 300 calculates c mod (p) first and accepts only lower l bit as a result of the calculation to output the lower l bit as a plaintext. The calculation is performed by Equation 4.

$$M=(C\bmod(p))\bmod(2^l) \quad \text{Equation 4}$$

In order to decrypt l bit information, the encryption may be performed by the above-described method. The ciphertext for single bit data may be encrypted as mentioned in Equation 5.

$$M=(C\bmod(p))\bmod(2) \quad \text{Equation 5}$$

According to the present invention, plaintext corresponding to a compression ratio l which is defined in advance in one ciphertext is encrypted so that the number of ciphertexts required to store l bit plaintext information in an encrypted status is reduced l from to 1. As a result, a cost for a space for storing the encryption data is reduced at the same ratio.

Hereinafter, a compressed encryption/decryption method which is performed in a compressed encryption/decryption system according to the above-described exemplary embodiment will be described.

Figure 5:
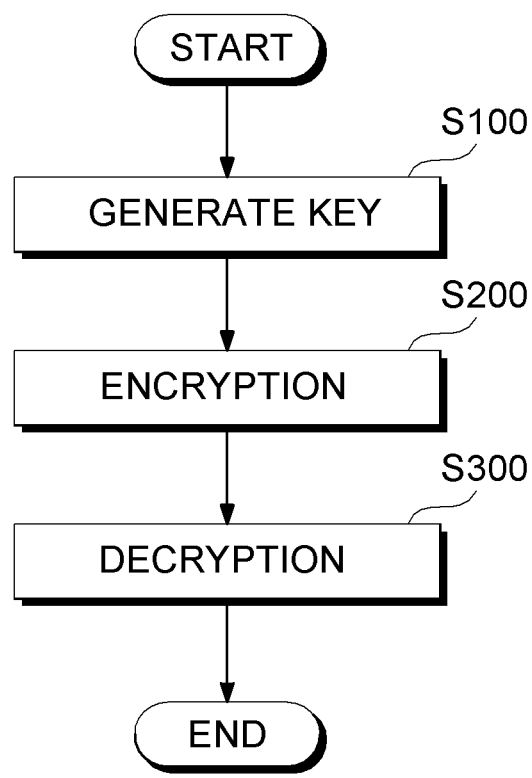
FIG. 5 is a flowchart illustrating a compressed encryption/decryption method according to an exemplary embodiment of the present invention.

Referring to FIG. 5, the compressed encryption/decryption method according to the exemplary embodiment includes a key generating step S100, an encrypting step S200, and a decrypting step S300.

The key generating step S100 receives a predetermined security parameter and a value of a compression ratio and generates a public key and a secret key for encrypting and decrypting plaintext information.

Figure 6:
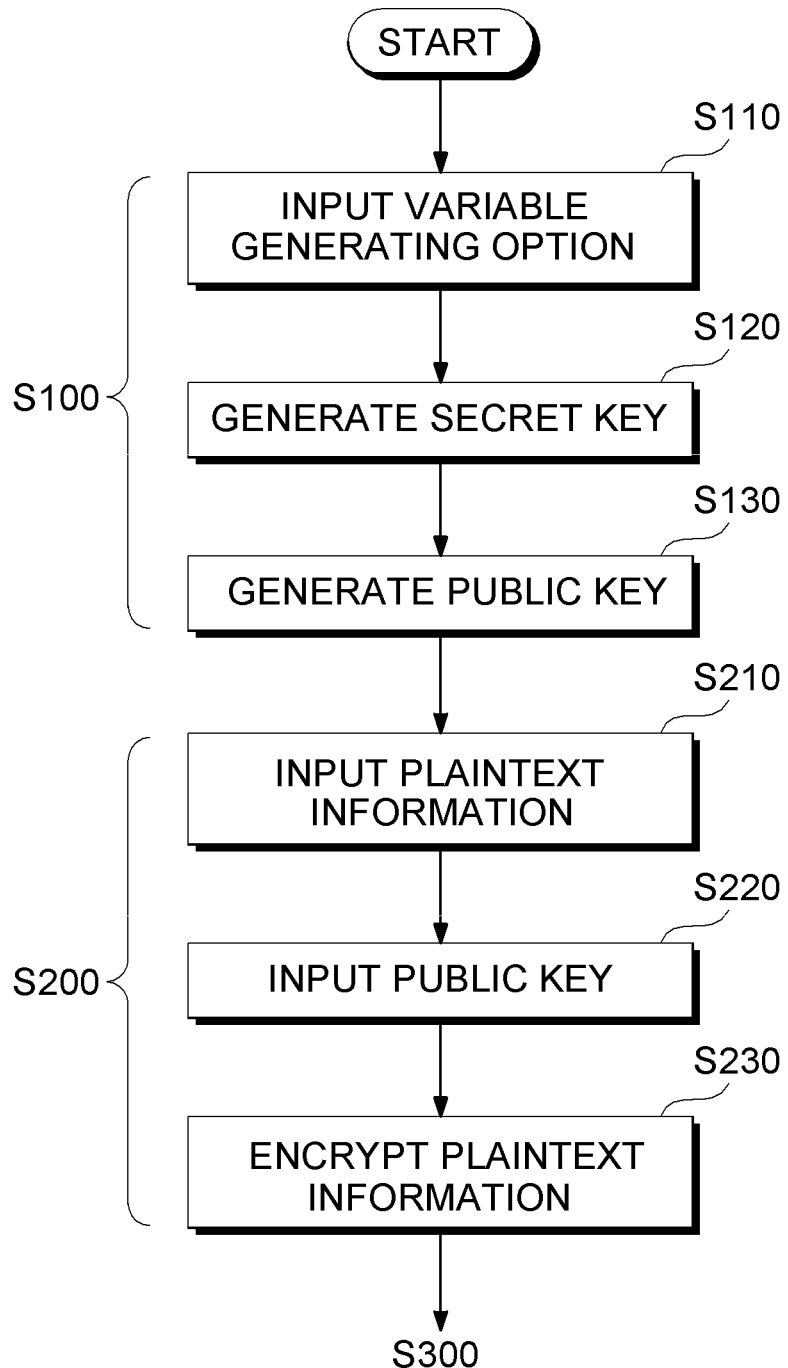
FIG. 6 is a detailed flowchart illustrating a key generation and encryption method according to an exemplary embodiment of the present invention.

Referring to FIG. 6, the key generating step S100 receives k which is a stability reference and a compression ratio l as a variable generating option input in step S110 and generates a secret key p which complies with the condition in step S120, and generates a public key for compressed encryption using the secret key p in step S130.

The encrypting step S200 encrypts plaintext information using the generated public key, particularly encrypts l bits selected from the plaintext information at once.

Referring to FIG. 6, the encrypting step S200 receives plaintext information in step S210, receives the public key in step S220, and encrypts l bits selected from the plaintext information using a selected arbitrary subset and a selected arbitrary random number in step S230.

The decrypting step S300 decrypts the compressed ciphertext using a generated secret key.

Figure 7:
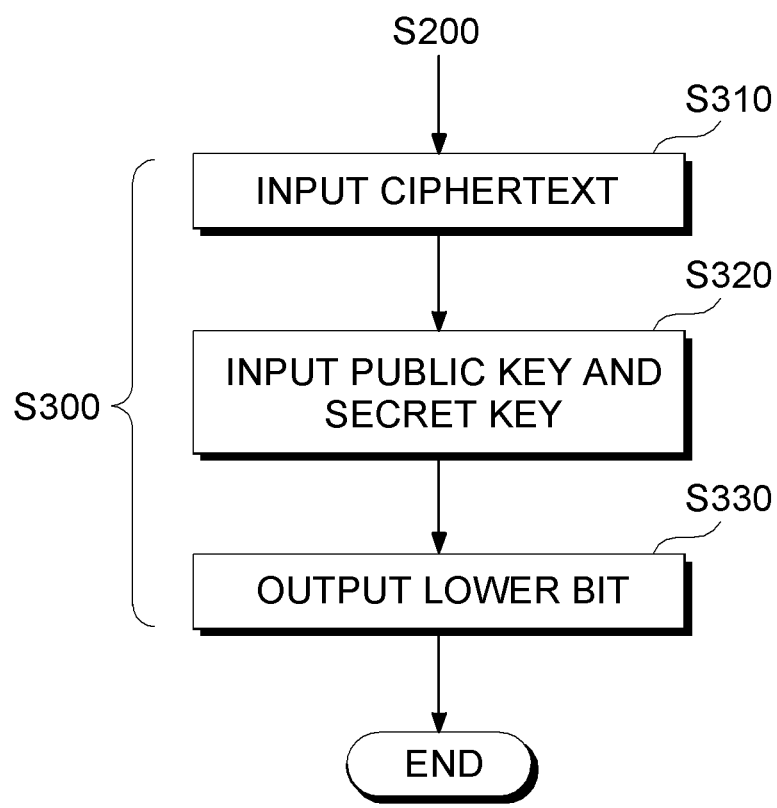
FIG. 7 is a detailed flowchart illustrating a decryption method according to an exemplary embodiment of the present invention.

Referring to FIG. 7, the decrypting step S300 receives a given compressed ciphertext c and information on the public key and the secret key required for decryption thereof in steps S310 and S320. And then, if all required input information is provided, only lower l bits of the decryption result is accepted to be output as a plaintext in step S330.

Each step of the compressed encryption/decryption method according to the exemplary embodiment is performed by the key generation module 100, the encryption module 200, and the decryption module 300 of the above-described compressed encryption/decryption device so that the detailed description thereof will be omitted.

However, the compressed encryption/decryption method of the present disclosure may be implemented as a computer readable code in a computer readable recording medium. The computer readable recording medium includes all types of recording device in which data readable by a computer system is stored.

Examples of the computer readable recording media include an ROM, an RAM, a CD-ROM, a magnetic tape, a floppy disk, and an optical data storage device and the computer readable recording media is distributed into a computer systems connected through a network and a computer readable code is stored and executed therein by a distribution method. Further, a functional program, code, and code segment which may implement the present invention may be easily deducted by a programmer in the art.

The above description is illustrative purpose only and various changes, modifications, and variations become apparent to those skilled in the art within a scope of an essential characteristic of the present invention. Therefore, as is evident from the foregoing description, the exemplary embodiments and accompanying drawings disclosed in the present invention do not limit the technical spirit of the present invention. The scope of the present invention may be interpreted by the appended claims and the technical spirit in the equivalent range is intended to be embraced by the invention.

What is claimed is:

1. A compressed encryption/decryption providing system, comprising one or more microprocessors to embody a plurality of functional modules including:
   a key generation module which receives a predetermined security parameter and a value of a compression ratio from a user, generates a public key and a secret key according to the predetermined security parameter and the value of the compression ratio for encrypting and decrypting plaintext information, and outputs the public key and the secret key;
   an encryption module which encrypts the plaintext information, received from a server, using the generated public key, wherein the encryption module encrypts l bits selected from the plaintext information at once, where l is greater than 1; and
   a decryption module which decrypts the compressed ciphertext using a generated secret key.

2. The compressed encryption/decryption providing system of claim 1, wherein the key generation module uses the secret key which is generated as an odd number to select the public key in accordance with a predetermined condition.

3. The compressed encryption/decryption providing system of claim 2, wherein the secret key is used to select the public key by selecting at least one key from a key group which satisfies a determined condition as a public key.

4. The compressed encryption/decryption providing system of claim 1, wherein the key generation module uses the secret key generated as an odd number to generate a public key to encrypt the plaintext in accordance with a predetermined condition.

5. The compressed encryption/decryption providing system of claim 1, wherein the encryption module encrypts l bits selected from the plaintext information using a selected subset of a set comprising numbers from 1 to a predetermined number and a selected arbitrary random number.

6. A compressed encryption/decryption providing method, comprising:
   receiving a predetermined security parameter and a value of a compression ratio from a user, generating a public key and a secret key according to the predetermined security parameter and the value of the compression ratio for encrypting and decrypting plaintext information, and outputting the public key and the secret key;
   encrypting the plaintext information that is received from a server using the generated public key, wherein encrypting l bits selected from the plaintext information at once, where l is greater than 1; and
   decrypting the encrypted ciphertext using the generated secret key.

7. The compressed encryption/decryption providing method of claim 6, wherein the generating of a public key and a secret key uses the secret key which is generated as an odd number to select the public key in accordance with a predetermined condition.

8. The compressed encryption/decryption providing method of claim 7, wherein the secret key is used to select the public key by selecting at least one key from a key group which satisfies a determined condition as a public key.

9. The compressed encryption/decryption providing method of claim 6, wherein the generating of a public key and a secret key uses the secret key which is generated as an odd number to select the public key which encrypts the plaintext in accordance with the predetermined condition.

10. The compressed encryption/decryption providing method of claim 6, wherein the encrypting encrypts l bits selected from the plaintext information using a selected subset of a set comprising numbers from 1 to a predetermined number and a selected arbitrary random number.

11. A compressed encryption providing method, comprising:
- receiving a predetermined security parameter and a value of a compression ratio from a user, and generating a public key which compressed encrypts a plaintext information according to the predetermined security parameter and the value of the compression ratio using the secret key which is generated as an odd number;
- outputting the public key and the secret key; and
- encrypting l bits selected from the plaintext information that is received from a server using a selected arbitrary subset and a selected arbitrary random number, where l is greater than 1.

12. A computer-readable storage medium which is recognized by a computer in which a program which executes a process is stored, the process comprising:
- receiving a predetermined security parameter and a value of a compression ratio from a user and generating a public key which compressed encrypts a plaintext information according to the predetermined security parameter and the value of the compression ratio using the secret key which is generated as an odd number;
- outputting the public key; and
- encrypting l bits selected from the plaintext information that is received from a server using a selected arbitrary subset and a selected arbitrary random number, where l is greater than 1.

* * * * *